United States Patent
Thomas

(10) Patent No.: US 10,586,423 B2
(45) Date of Patent: Mar. 10, 2020

(54) SYSTEMS AND METHODS FOR SELECTING A REMOTE DEVICE BASED ON EVENT OUTCOMES

(71) Applicant: sQuared Bet, Inc., Shelburne, VT (US)

(72) Inventor: Nathan Thomas, Shelburne, VT (US)

(*) Notice: Subject to any disclaimer, the term of this patent is extended or adjusted under 35 U.S.C. 154(b) by 0 days.

(21) Appl. No.: 16/420,416

(22) Filed: May 23, 2019

(65) Prior Publication Data

US 2020/0027303 A1    Jan. 23, 2020

Related U.S. Application Data

(60) Provisional application No. 62/700,403, filed on Jul. 19, 2018.

(51) Int. Cl.
    *G07F 17/32*     (2006.01)
    *G06K 9/62*     (2006.01)

(52) U.S. Cl.
    CPC ......... *G07F 17/323* (2013.01); *G06K 9/6267* (2013.01); *G07F 17/3288* (2013.01)

(58) Field of Classification Search
None
See application file for complete search history.

(56) References Cited

U.S. PATENT DOCUMENTS

| | | | |
|---|---|---|---|
| 7,069,243 B2 | 6/2006 | Dinwoodie | |
| 7,096,197 B2 | 8/2006 | Messmer et al. | |
| 7,617,145 B1 | 11/2009 | Peterson | |
| 9,406,196 B2 | 8/2016 | Asher et al. | |
| 9,430,909 B2* | 8/2016 | Shore | G07F 17/3218 |
| 9,773,275 B2 | 9/2017 | Gladis et al. | |
| 9,947,041 B2 | 4/2018 | Friedman | |
| 2006/0282368 A1 | 12/2006 | Cai et al. | |
| 2007/0088661 A1 | 4/2007 | De Verdier et al. | |
| 2007/0244762 A1 | 10/2007 | Du Preez et al. | |
| 2012/0046094 A1* | 2/2012 | Shore | G07F 17/3288 463/25 |
| 2012/0046095 A1* | 2/2012 | Shore | G07F 17/3244 463/25 |

(Continued)

OTHER PUBLICATIONS

Jeffrey E Teich, et al., Emerging multiple issue e-auctions, report, Sep. 26, 2003, Erasmus Research Institute of Management, Rotterdam, The Netherlands.

*Primary Examiner* — Ronald Laneau
(74) *Attorney, Agent, or Firm* — Caldwell Intellectual Property Law

(57) ABSTRACT

A system and method for selecting a remote device based on event outcomes includes a network associated with at least a server configured to receive event data of a particular event, classify components of the event data, and allocate components of the event data to tables including assignable coordinates. During the particular event, users within the network are able to provide user outcome entries to the assignable coordinates based on a prediction of which assignable coordinate will reflect the occurrence of an outcome of the particular event. Upon conclusion of the particular event, a determination of optimal user outcome entries provided to assignable coordinates associated with the outcome of the particular event is made, and a token is transmitted to a remote device associated with the user that provided the optimal user outcome entry.

20 Claims, 10 Drawing Sheets

(56) References Cited

U.S. PATENT DOCUMENTS

2015/0287278 A1* 10/2015 Shore ............... G07F 17/3218
   463/29
2016/0210815 A1  7/2016 Holt et al.
2018/0047098 A1  2/2018 Young et al.

* cited by examiner

FIG. 7

Username: KingPin

| Bid | Event type | Teams | Coordinate | Status | Time left | Date | Outcome |
|---|---|---|---|---|---|---|---|
| $30 | Football | White vs Red | (6, 9) | Highest bidder | End | 6/2/18 | Winner! Payout: $200 |
| $20 | Football | Black vs Yellow | (7, 2) | Highest bidder | 2.0 hours | 6/9/18 | Not available |
| $20 | Football | Blue vs Green | (5,0) | Low; Bid again | 4.0 hours | 6/9/18 | Not available |
| $10 | Soccer | Purple vs White | (2,4) | Low; Bid again | 6.5 hours | 6/9/18 | Not available |

Available Funds: $150

FIG. 9

SYSTEMS AND METHODS FOR SELECTING A REMOTE DEVICE BASED ON EVENT OUTCOMES

CROSS-REFERENCE TO RELATED APPLICATION

The present U.S. Utility patent application claims priority pursuant to 35 U.S.C. § 119(e) to U.S. Provisional Application No. 62/700,403 entitled "SYSTEMS AND METHODS OF AUCTIONING EVENT OUTCOME ASSETS", filed Jul. 19, 2018, which is hereby incorporated herein by reference in its entirety and made part of the present U.S. Utility patent application for all purposes.

FIELD OF THE INVENTION

The present invention generally relates to the field of online gaming. In particular, the present invention is directed to systems and methods for selecting a remote device based on event outcomes.

BACKGROUND

Online gambling is continuing to gain traction as it becomes legal in more jurisdictions, with a concomitant increase in technology that supports online gaming. However, existing technology is often overwhelmed in attempting to receive submissions from countless users and enumerate and track the numerous possibilities for a score of a game, or data associated with predictions for players' statistics. Another related issue is that it is difficult to identify remote devices associated with users that properly predict event outcomes and components of event outcomes due to the continuously growing amount of event data provided by the internet.

SUMMARY OF THE DISCLOSURE

In one aspect, a system for selecting a remote device based on event outcomes includes at least a server designed and configured to receive a plurality of data associated with outcomes of an event, wherein the plurality of data comprises a plurality of assignable coordinates, each assignable coordinate associated with an occurrence of an outcome of the event. The server is also configured to generate a table comprising the assignable coordinates and receive user outcome entries from users operating on the system. The server is further configured to assign the user outcome entries to the assignable coordinates prior to the termination of the event and determine optimal user outcome entries included within the assignable coordinates associated with the outcome of the event. The server is further configured to select the user associated with at least an optimal user outcome entry and transmit a token to a remote device associated with the user.

In another aspect, a system for selecting a remote device based on event outcomes includes at least a server. The at least a server is designed and configured to receive a plurality of data associated with an outcome of an event. The at least a server is designed and configured to generate a table comprising a plurality of assignable coordinates, wherein each coordinate of the plurality of coordinates are associated with an occurrence of an outcome of the event. The at least a server is designed and configured to receive, via at least a server, a plurality of user outcome entries associated with a plurality of users. The at least a server is designed and configured to assign the plurality of user outcome entries to the plurality of assignable coordinates. The at least a server is designed and configured to determine, based on the plurality of assignable coordinates, a plurality of optimal user outcome entries associated with the occurrence of the outcome of the event. The at least a server is designed and configured to select, in response to the determination, based on at least an assignable coordinate of the plurality of assignable coordinates comprising at least an optimal user outcome entry of the plurality of optimal user outcome entries, at least a first user of the plurality of users associated with the at least an optimal user outcome entry. The at least a server is designed and configured to transmit at least a token to the remote device, wherein the remote device is associated with the at least a first user.

In another aspect, a method for selecting a remote client device in a gaming network includes receiving a plurality of event data over the gaming network. The method further includes generating a table comprising a plurality of assignable coordinates, wherein each coordinate of the plurality of coordinates is associated with an occurrence of an outcome of the event, receiving a plurality of user outcome entries associated with a plurality of users over the gaming network, and assigning the plurality of user outcome entries to the plurality of assignable coordinates. The method further includes determining a plurality of optimal user outcome entries associated with the occurrence of the outcome of the event based on the plurality of assignable coordinates, selecting, based on at least an assignable coordinate of the plurality of assignable coordinates comprising at least an optimal user outcome entry of the plurality of optimal user outcome entries, at least a first user of the plurality of users associated with the at least an optimal user outcome entry in response to the determination, and transmitting at least a token to the remote device, wherein the remote device is associated with the at least a first user.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 7 is a table representing a table of an event at user interface in accordance with an embodiment;

FIG. 9 is a table representing an example of a user profile displaying history of user outcome entries at user interface in accordance with an embodiment.

Figure 1:
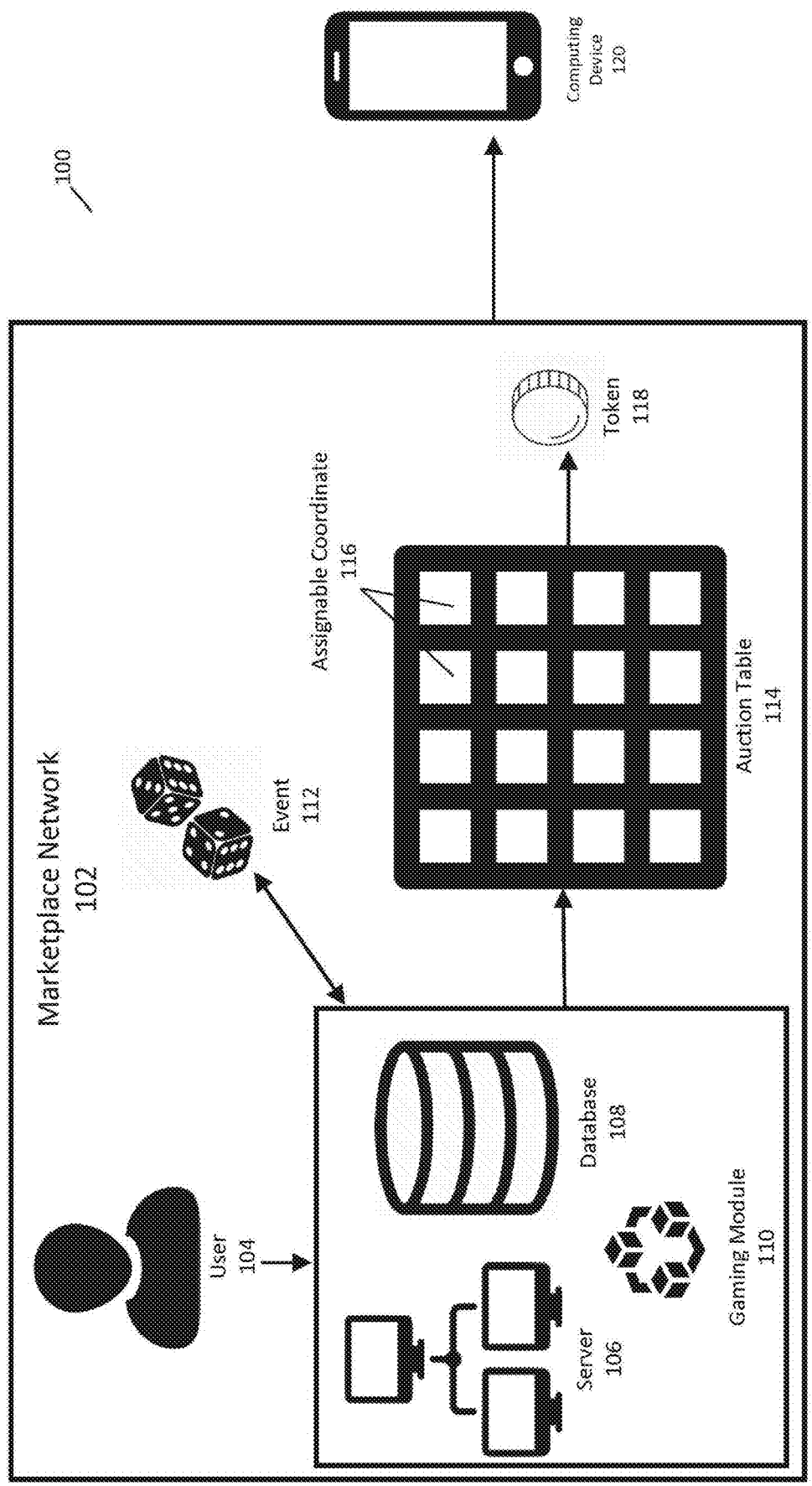
FIG. 1 is a high-level block diagram illustrating a system for selecting a remote device based on event outcomes in accordance with an embodiment.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to embodiments of systems and methods for selecting a remote device based on event outcomes. Systems and methods for selecting a remote device based on event outcomes may be integrated into online gaming networks, mobile applications platforms, or any other server-based applications configured to operate on a computing device. In one embodiment, the remote device is selected based on event outcome assets. Event outcome assets, which are associated with event outcomes, are broadly defined as a collection of assets associated with a particular outcome of a particular event. Here and as will be appreciated after reading this disclosure in its entirety by a person of ordinary skill in the art, is a system configured to operate within a network that allows a user to participate in an selection process pertaining to an event by initiating one or more user outcome entries that may be associated with data relating to components of the event or the outcome of the event. The one or more user outcome entries may be allocated among a plurality of assignable coordinates in which each assignable coordinate serves as an intersection of an identifiable row and an identifiable column that corresponds to a component relating to either the event itself or the outcome of the event. During the event, the assignable coordinates are configured to continuously receive one or more user outcome entries from a plurality of users within the network. Upon termination of the event, the system is configured to select one or more applicable assignable coordinates comprising optimal user outcome entries and transmit one or more tokens to the users associated with the optimal user outcome entries.

In another aspect, a system for selecting a remote device based on event outcomes includes at least a server designed and configured to receive event data of a particular event and allocate the event data across a table including a series of identifiable rows reflecting a first component of the event data and a series of identifiable columns reflecting a second component of the event data. The table is configured to reflect intersections of the series of identifiable rows and columns, which are each associated with outcomes of the particular event or components associated with outcomes of the particular event. The system may further include a user interface configured to user outcome entries from users that include a first numerical quantity. After determining a user balance, the user outcome entries are assigned to the intersections and an optimal user entry is determined for the applicable intersections based on the user outcome entry in the intersection including the highest numerical quantity. The remote device associated with the user who provided the user outcome entry with the highest numerical quantity included in the applicable intersection is transmitted a token.

As described herein, an event may be, but is not limited to, sporting competitions, casino games, live-action games, horse racing, table games, charitable games, games of chance/probability, and/or games associated with occurrences in real-time.

As described herein, a token may be, but is not limited to, a credit associated with a user account operating on a network. The credit need not be considered one of monetary value, but rather a unit of measurement relating to the user account, which is configured to be exchangeable, transferable, and in some embodiments charitable/gratuitous among entities within and outside of the network.

The systems and methods described within provide improvements to internet-based interactive gaming system generation, maintenance, and presentation in real-time. The systems and methods support scalability of receiving large quantities of event data from multiple sources, optimization of allocation of event data across a network, and faster and more secure processing of transactions associated with event data. Also, the system is able to reduce human error associated with manually managing and allocating event outcome assets by using a rule-based model or a machine-learned model to generate feature values of components of event data. Thus, the systems and methods described herein improve the function of computing systems, more particularly online gaming systems by enhancing the speed, accuracy, and efficiency of processing and presenting event data in real time.

Referring now to FIG. 1 an exemplary embodiment of system 100 in which the techniques described may be practiced is illustrated. Various components of system 100 are implemented at least partially by hardware at one or more computing devices, such as one or more hardware processors executing instructions stored in one or more memories for performing various functions described herein. For example, descriptions of various components (or modules) as described in this application may be interpreted by one of skill in the art as providing pseudocode, an informal high-level description of one or more computer structures. The descriptions of the components may be converted into software code, including code executable by an electronic processor. System 100 illustrates only one of many possible arrangements of components configured to perform the functionality described herein. Other arrangements may include fewer or different components, and the division of work between the components may vary depending on the arrangement.

Still referring to FIG. 1, system 100 includes at least a server 104. At least a server 10 may include any computing device as described in this disclosure, including without limitation a microcontroller, microprocessor, digital signal processor (DSP) and/or system on a chip (SoC) as described in this disclosure. At least a server 104 may be housed with, may be incorporated in, or may incorporate one or more sensors of at least a sensor. Computing device may include, be included in, and/or communicate with a mobile device such as a mobile telephone or smartphone. At least a server may include a single computing device operating independently, or may include two or more computing device operating in concert, in parallel, sequentially or the like; two or more computing devices may be included together in a single computing device or in two or more computing devices. At least a server with one or more additional devices as described below in further detail via a network interface device. Network interface device may be utilized for connecting a at least a server to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. At least a server may include but is not limited to, for example, a at least a server or cluster of computing devices in a first location and a second computing device or cluster of computing devices in a second location. At least a server 104 may include one or more computing devices dedicated to data storage, security, distribution of traffic for load balancing, and the like. At least a server 104 may distribute one or more computing tasks as described below across a plurality of computing devices of computing device, which may operate in parallel, in series, redundantly, or in any other manner used for distribution of tasks or memory between computing devices. At least a server 104 may be implemented using a "shared nothing" architecture in which data is cached at the worker, in an embodiment, this may enable scalability of system 100 and/or at least a server.

With continued reference to FIG. 1, System 100 includes network 102; at least a server 104 may be designed and configured to communicatively couple to a user 106 by way of a remote computing device 120. Network 102 may include a database 108 and a gaming module 110. In one embodiment, network 102 and/or at least a server 104 may be implemented by a network of communicatively coupled computing devices configured to support functionality known in the art such as encryption, user account security, network communicative channels, and the like. In an embodiment, at least a server 104 is configured to support interactions with external accounts associated with user 106 relating to external gaming systems, financial institutions, mobile plugins, and any other applicable software configured to be integrated into a network. In an embodiment, at least a server 104 may be operated by a charitable or non-profit organization configured to host events which may result in honors being provided to participants of the hosted events. At least a server 104 includes functionality to receive a plurality of data associated with event 112, which may be extracted from a source within or outside of network 102 including, but not limited to, news/media networks, sports networks, online gaming platforms, social networks, or any other applicable source comprising events. In one embodiment, at least a server 104 and/or network 102 further includes and/or communicates with components to generate one or more tables 114 configured for utilizing data of event 112. One or more tables 114 may be linked to at least a token 118, which may be allocated to user 106 and/or computing device 120 depending on the outcome of event 112. At least a server 104 and/or network 102 is configured to be presented to user 106, via a graphical user interface (not shown), on computing device 120.

Continuing to refer to FIG. 1, although only a single user 106, server 104, database 108, and remote computing device 120 are depicted, system 100 may include multiple of any component comprised within network 102. Examples of computing device 120 include a laptop computer, a tablet computer, a smartphone, a desktop computer, a Personal Digital Assistant (PDA), and any other mechanism used to access networks or applications. An example of an application that executes on computing device 120 and executes network 102 includes a web application executing within a web browser or a client application (installed on computing device 120) that is configured to communicate with server 104, gaming module 110, or a real-time event processing system over network 102.

Still referring to FIG. 1, system 100 may implement data bus streaming, pipelining, online/offline processing, storage mechanisms, and other functions that enable system 100 to operate as a multi-layered frontend/backend system. In one embodiment, data of event 112 is extracted, aggregated, and allocated across table 114. Data of event 112 may be derived from gaming module 110, which is configured to operate an online gaming system that supports interactions and communications of a plurality of users 106, and handles actions, decisions, and outcomes associated with user 106. For example, gaming module 110 may be hosting an internet-based event which may or may not require the involvement of the plurality of users. Data associated with the internet-based event may be automatically extracted from gaming module 110, aggregated based on its content or relevance via server 104, and allocated amongst table 114. In one embodiment, gaming module 110 is configured to communicate with server 104 and database 108 in order to collect information pertaining to user 106, such as, but not limited to, geographic location of user 106, metadata relating to the interactions between user 106 and network 102, account balance of user 106, a history of user outcome entries of user 106, and user outcome entries of user 106 relating to event 112.

Continuing to refer to FIG. 1, in one embodiment, table 114 may comprise a plurality of identifiable rows each of which correspond to a first component of data of event 112 and a plurality of identifiable columns each of which correspond to a second component of data of event 112, wherein the intersection of the identifiable rows and the identifiable columns generates a plurality of assignable coordinate 116 configured to receive and store user outcome entries of user 106, which are managed by gaming module 110. For example, if event 112 is a NBA game between the Boston Celtics and the Los Angeles Lakers, then an identifiable column may be the total amount of points scored by the Boston Celtics and an identifiable row may be the total amount of points scored by the Los Angeles Lakers resulting in the final score of the game being reflected by an intersection of the identifiable row and the identifiable column. In one embodiment, the data of event 112 is received over network 102 via sources outside of network 102, via push technology from the source or manual inputs provided by user 106 if user 106 is an authenticated source for event data, or event data may be recycled from a previously held allocation process by clearing table 114 of previously applied user outcome entries but keeping the previously used identifiable rows and identifiable columns corresponding to the first and second components of data of event 112 respectively. Network 102 is configured to continuously receive aggregated data regarding event 112 via an event processing system. For example, sports events data may be received at an hourly or daily rate from ESPN in which each received sports event would correlate to a separate table 114, or a single table 114 may account for multiple sporting events that are associated with each other such as every sporting event relating to a specific team within a time period (preseason, season, etc.). Assignable coordinates 116 may be configured to receive user outcome entries directly via interactions of user 106 such as user 106 clicking or tapping directly on the applicable assignable coordinate 116 or dragging a marker over the applicable assignable coordinate 116 via a graphical user interface on computing device 120. In one embodiment, gaming module 110 is configured to allocate the user outcome entries to assignable coordinate 116 automatically based on data associated with user 106 stored within database 108, such data may include, but is not limited to, assignable coordinate 116 previously selected by user 106 for a previous event, or assignable coordinate 116 selected based on tips or recommendations retrieved from an external source such as a sports analyst or prediction module. In an embodiment, selection and placement of user outcome entries in assignable coordinates 116 occurs either prior to the occurrence of event 112, during the occurrence of event 112, or prior to conclusion of event 112 (up until the last 5 minutes of event 112). During event 112, gaming module 110 is able to provide a designated time window (either before or any time prior to the conclusion of event 112) for user 106 to provide user outcome entries based on determinations by user 106 as to whether assignable coordinate 116 will be suggestive of the final score of event 112. In one embodiment, user outcome entries may comprise a plurality of micro user outcome entries that may account for predicted outcomes regarding micro-components of event 112. For example, user 106 may allocate a user outcome entry to assignable coordinate 116 reflecting the final score prediction of a basketball game, the user outcome entry may comprise or be associated with a micro user outcome entry that reflects a prediction of how many points a particular player participating in event 112 will score by the end of event 112.

Continuing to refer to FIG. 1, in one embodiment, server 104 is configured to allocate the user outcome entries of user 106 among assignable coordinates 116 based upon preferences and input provided by user 106, which may be stored in database 108. Based on the outcome of event 112, gaming module 110 selects assignable coordinate 116 that most accurately reflects the outcome of event 112. In one embodiment, at least a server 104 is configured to perform or utilize a tool to perform web scraping/web harvesting in order to receive data of event 112 from sources on the internet and process data of event 112 via a language processing module configured to extract one or more words, characters, strings, or symbols from a document source such as, but not limited to, excel, xml, pdf, doc, or any other type of file comprising extractable data. In one embodiment, allocation of data of event 112 to table 114 may be accomplished by dynamic allocation or using array index linking. Data of event 112 may be received over network 102, and server 104 may link data of event 112 to index values or string characters (via string comparisons) configured to be stored in table 114. For the purpose of this disclosure, assignable coordinate 116 may be generated based on dynamic allocation or fixed allocation of data of event 112 across table 114 wherein various components of data of event 112 are deciphered and parsed based on their content. In one embodiment, system 100 is configured to utilize a rule-based or a machine-learned model in order to classify data of event 112 as components configured to be utilized in the generated table 114. Server 104 is configured to recognize the tf-idf of n-grams within data of event 112 and enter them into a trained classification model and subsequently server 104 delegates the n-grams across table 114 (via the identifiable rows and columns) accordingly. For example, a source may provide network 102 with data of event 112, and the classification model may decide that data of event 112 comprises a plurality of designated time periods (quarters, half, chukkers, etc.) which server 104 allocates to the identifiable columns and a plurality of scores which server 104 allocates to the identifiable rows. Upon selection of assignable coordinate 116 most accurately reflecting the outcome of event 112, user outcome entries within the selected assignable coordinate 116 provided by a plurality of users 106 are analyzed, via server 104 or gaming module 110, based on their distinctions, and an optimal user outcome entry is designated within the user outcome entries of the selected assignable coordinate 116. Distinctions of the user outcome entries may be related to the numerical quantity associated with each individual user outcome entry, the amount of user outcome entries within the assignable coordinate 116 provided by a particular user, or the type of user outcome entries provided by the plurality of users 106. For example, gaming module 110 may host a virtual selection process in real-time relating to a horse race comprising 10 horses wherein each identifiable row represents a horse participating in the race and each identifiable column represents the place the horse ended the race in (e.g., first place, second place). User 106 is able to provide a user outcome entry for each horse in the race during the course of the race, and upon conclusion of the race gaming module 110 is able to analyze each user outcome entry provided by user 106 and analyze them with respect to the user outcome entries provided by the other users of network 102 that were allocated to the assignable coordinate 116 that accurately reflect the outcome of the race. Therefore, if user 106 provided a user outcome entry to the assignable coordinate 116 that properly reflects that "Seabiscuit" would end the race in second place then the user outcome entry would be analyzed based on the other user outcome entries provided by other users that predicted that "Seabiscuit" would end the race in second place.

Figure 2:
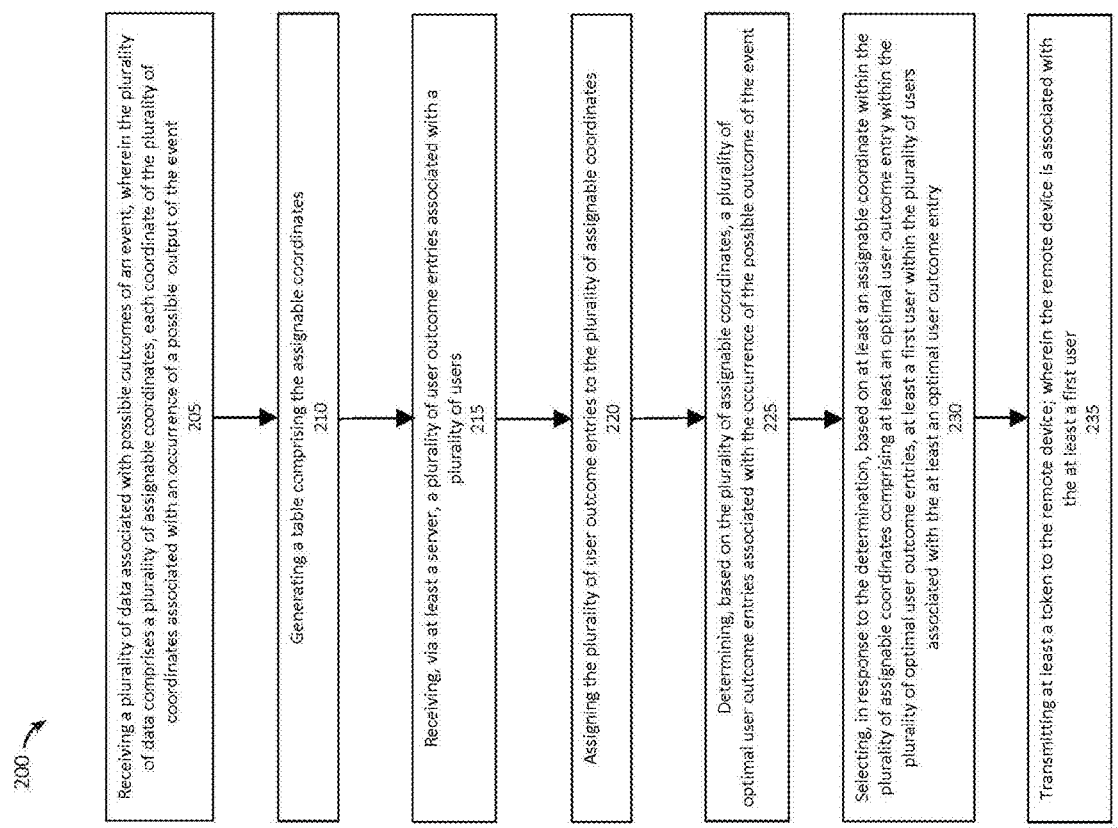
FIG. 2 is a high-level flow diagram illustrating a method for selecting a remote device based on event outcomes in accordance with a first embodiment.

Referring now to FIG. 2, FIG. 2 illustrates a first method 200 for selecting a remote device according to exemplary aspects of the instant application. One or more systems made in accordance with the present innovation (examples of such being further described hereinbelow) may implement aspects of method 200 using one or more platforms such as a computer, a system of computers, an Internet application, a web browser, etc., or any combination of these. At step 205, a plurality of data associated with outcomes of event 112 is received by server 104. The plurality of data associated with outcomes of event 112 may be extracted from one or more sources outside of system 100 which may include, but are not limited to, media sources, internet gaming systems, sports networks, and any other applicable source of event data. At step 210, table 114 is generated by gaming module 110 comprising a plurality of assignable coordinates 116. In one embodiment, the plurality of event data is configured to be dynamically allocated across table 114 wherein each assignable coordinate 116 is associated with an occurrence of an outcome of event 112. Table 114 is generated based on the plurality of data associated with outcomes of event 112 which may include a preference such as, but not limited to, a designated period of time prior to the termination of event 112 for user 106 to provide a user outcome entry, a minimum numerical quantity associated with a user outcome entry required in order for a user outcome entry to be provided, or a minimum user account balance in order for user 106 to provide a user outcome entry.

At step 215, server 104 receives a plurality of user outcome entries associated with users operating on network 102. In one embodiment, user 106 may interact with table 114 directly via computing device 120 or gaming module 110 may automatically provide a user outcome entry for user 106 based on profile information or preferences associated with user 106. For example, if user 106 historically provides a user outcome entry in a specific assignable coordinate 116 or in a specific region of table 114 pertaining to a certain type of event 112, then gaming module 110 will automatically assign a user outcome entry to table 114 subject to prior authorization of user 106. At step 220, the user outcome entries are allocated to the plurality of assignable coordinates 116. In one embodiment, the user outcome entries are designed and allocated based upon the type of event 112 and the capacity of table 114. For example, if event 112 is a real-time news event such as a crash of a stock in the stock market wherein the identifiable rows represent a designated group of stocks predicted to drop in the near future and the identifiable columns represent stock quarters, the user outcome entries may be a compilation of a predicted percentage the stock drops associated with a numerical quantity allocated to the assignable coordinate 116 serving as an integration of the applicable stock that is predicted to crash and the quarter the stock crashed in.

At step 225, event 112 has terminated and gaming module 110 makes a determination of the one or more assignable coordinates that accurately reflect the outcome or outcomes of event 112 and the user outcome entries within the one or more assignable coordinates that accurately reflect the outcome or outcomes of event 112 that comprise the highest numerical quantity within assignable coordinate 116 are designated as optimal user outcome entries. At step 230, user 106 associated with the optimal user outcome entry is selected. At step 235, server 104, utilizing the assistance of gaming module 110, transmits token 118 to an account associated with user 106.

Referring again to FIG. 1, in one embodiment, server 104 makes a determination pertaining to an available balance within the account associated with user 106. Token 118 is configured to be transmitted among accounts associated with users within network 102. Server 104 includes components configured to transmit token 118 to external sources such as financial institutions or remittance processing systems. The account associated with user 106 is configured to be incremented or decremented based upon whether or not assignable coordinate 116 associated with the outcome of event 112 is determined to comprise the one or more optimal user outcome entries. For example, if user 106 provides user outcome entries to table 114 and none of the user outcome entries are designated as optimal user outcome entries then the cumulative numerical quantity associated with the user outcome entries provided by user 106 are decremented from the user account balance.

Figure 3:
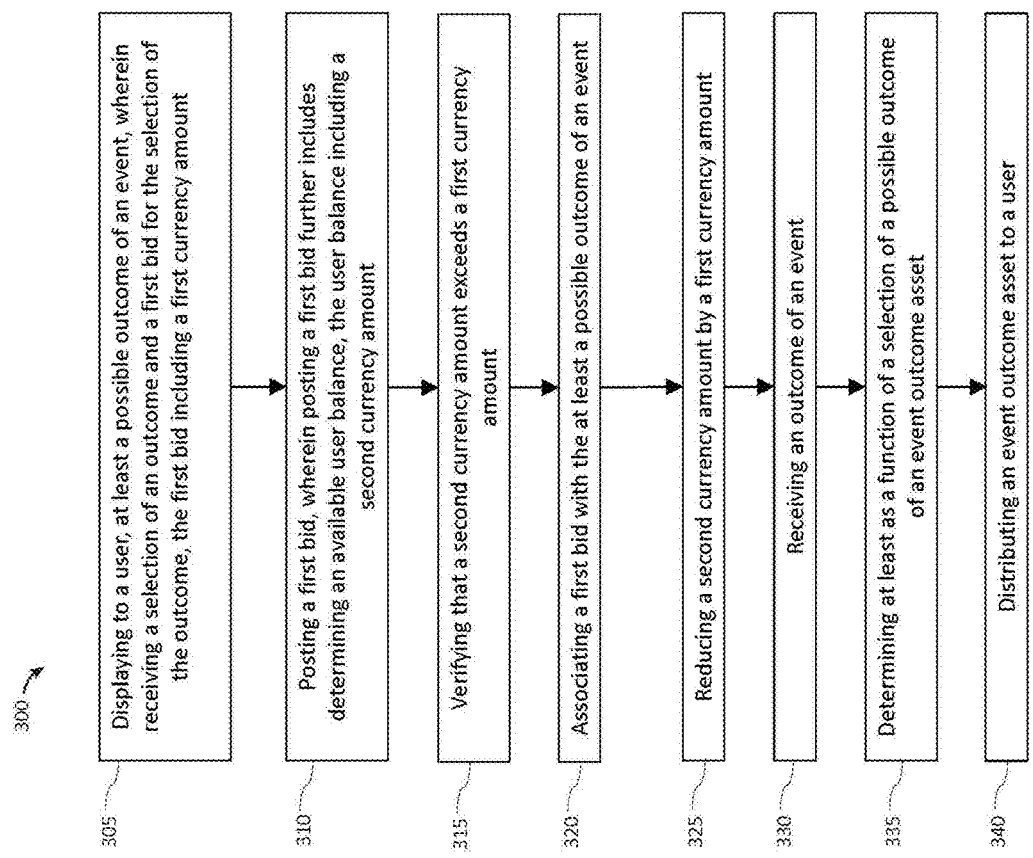
FIG. 3 is a high-level flow diagram illustrating a method for selecting a remote device based on event outcomes in accordance with a second embodiment.

Referring now to FIG. 3, a second method 300 for selecting a remote device according to exemplary aspects of the instant application is illustrated. Method 300 may be implemented according to any means or method as described above in reference to FIGS. 1-2. At step 305 of exemplary method 300, at least an outcome of event 112 may be displayed to user 106, wherein receiving a selection of an outcome and a first user outcome entry for the selection of the outcome may include a first numerical quantity. At step 310, a first user outcome entry may be posted where posting the first user outcome entry further includes determining an available user balance including a second numerical quantity. At step 315, of a method 300, verifying that a second numerical quantity exceeds a first numerical quantity may occur. At step 320, a first user outcome entry may be associated with at least an outcome of event 112. At step 325, a second numerical quantity may be reduced by a first numerical quantity. At step 330, an outcome of event 112 may be received. At step 335, at least a function of a selection of an outcome of event 112 outcome asset may be determined. At step 340, event 112 outcome asset may be distributed to user 106.

Figure 4:
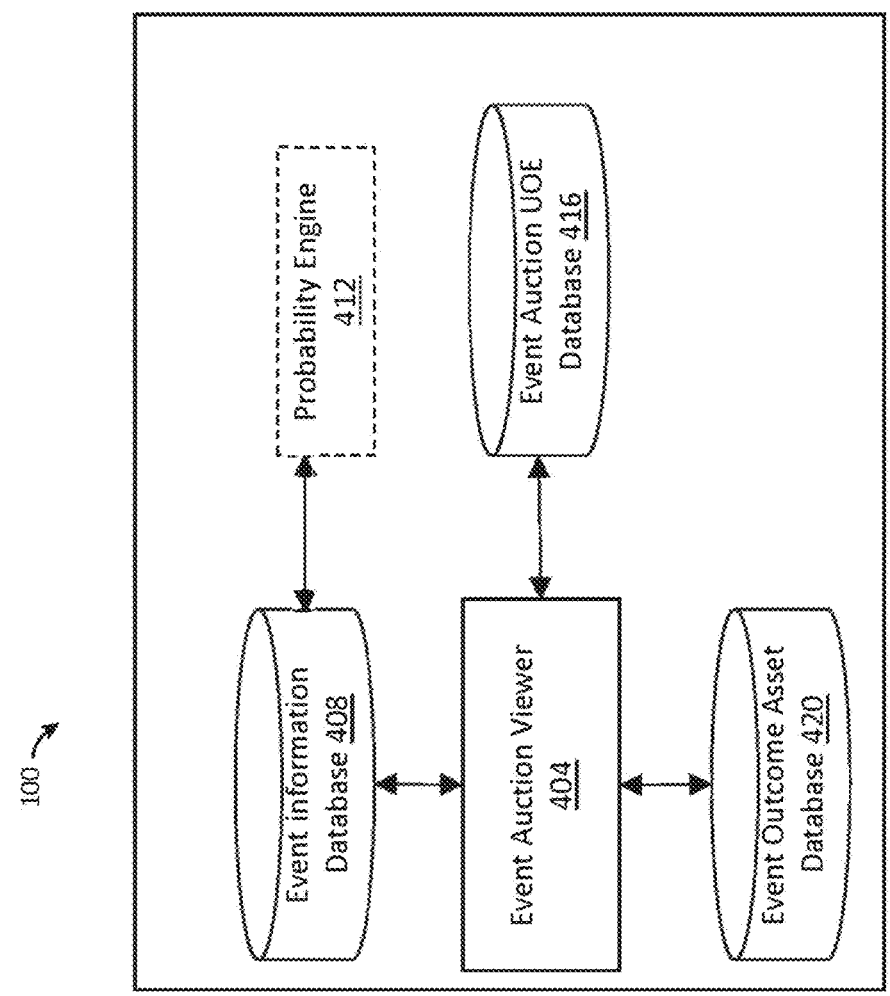
FIG. 4 is a block diagram illustrating a system for selecting a remote device based on event outcomes in accordance with a second embodiment.

Referring now to FIG. 4, an exemplary network 102 for selecting a remote device based on event outcomes in which methods 200 and 300 of FIGS. 2-3 may be implemented is illustrated. In this example, network 102 enables one or more users to place user outcome entries on one or more tables 114 associated with the outcome of one or more events 112 and receive one or more winning assets as a result of outcome of event 112. Network 102 may include software that enables communication between/among users and may comprise, for example, one or more websites, a distributed or decentralized network, and/or a peer-to-peer network, among other known types of networks, servers, clients, and programs/add-ons. Notably, in some embodiments, network 102 may implement all of the steps of methods 200 and 300 of FIGS. 2-3 FIG., though in other embodiments other components, such as a network client or add-on or third-party app, may implement one or more steps as will be readily appreciated by a person of ordinary skill in the art after reading this disclosure in its entirety. Network 102 may further include an Event viewer 404, which users may access independently or through one or more other programs to interact with the network, place user outcome entries, change user preferences, and/or interact with other tools made available, as described further below in the context of FIG. 4.

Still referring to FIG. 4, an event information database 408 may compile data from an outside event information network, and may further take into account host site preferences, where a software may create at least an table or something similar, may calculate a probability of each event occurring at each coordinate with an optional probability engine 412, inputs this information at each coordinate, and is displayed to users in an Event viewer 404. User outcome entries may be placed, for example, using an Event viewer 404 on assignable coordinate 116 representing an outcome of event 112 and stored in an event user outcome entry database 416. In an embodiment, each time a higher user outcome entry is placed on a specific table coordinate than the previous user outcome entry, a value of that coordinate may be updated, and new information may be stored in an event user outcome entry database 416 and displayed to all users in real-time. Assignable coordinate 116 may be assigned to the optimal user outcome entry of assignable coordinate 116 in table 114 for event 112 and stored in an event user outcome entry database 416. At event 112 start time, the event information database 408 will continuously update on-goings of event, updating users in real-time. By way of example, at a conclusion of event 112 a result in token 118 for user 106 who is assigned a coordinate in a table corresponding to event 112 outcome, and this information may be stored in an event outcome asset database 420.

Figure 5:
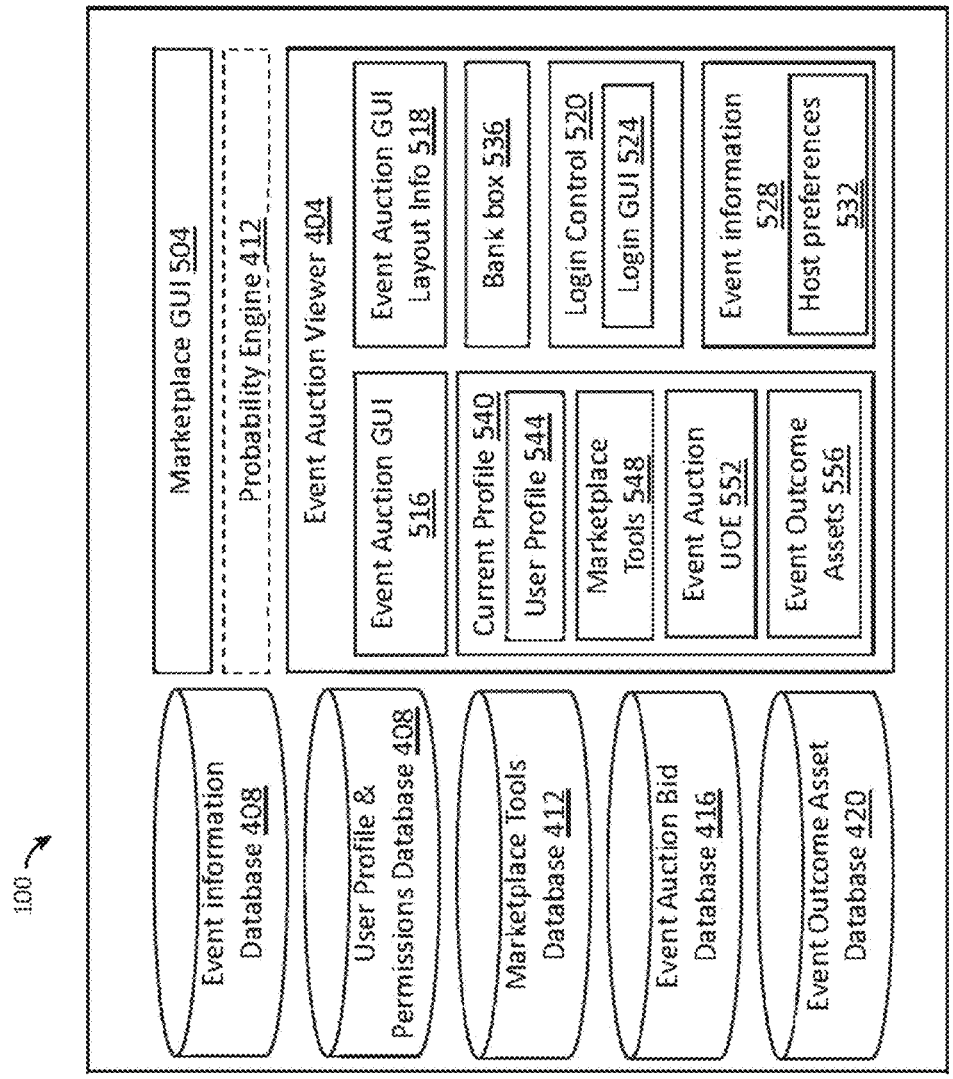
FIG. 5 is a block diagram illustrating a system for selecting a remote device based on event outcomes in accordance with a third embodiment.

Referring now to FIG. 5, an exemplary network 102 is illustrated but with reference to more features that may be present in an embodiment. In an embodiment, network 102 may receive information relating to one or more events and allow one or more users to view event details, place custom user outcome entries for the event, and follow event outcomes, for example. Network 102 may include a network GUI 504. In an embodiment network GUI 504 may include software allowing for enabling interaction between user 106 and network 102. In one example, Network 102 may implement network GUI 504 in a form of a display presenting default network features and an interface allowing user 106 to access Event viewer 404. Network 102 may further include an event information database 208, which may comprise a database or group of databases containing information on one or more events, updated in real-time. In an embodiment and by way of example, information in an event information database 408 may be utilized by an optional probability engine 212 in order to produce statistics on a likelihood of at least one outcome of event 112 occurring in table 114. Network 102 may also include a user profile and permissions database 308, which may comprise a database or group of databases and may store user profiles for any users permitted to access Event viewer 404 along with permission information identifying the particular tools/functionality each user is entitled to access.

Still referring to FIG. 5, a Network 102 may additionally include a network tools database 512, which in an embodiment may comprise a database or group of databases and may store network tools in the form of, e.g., source code or executable files. In an embodiment, user 106 may utilize an Event viewer 404 to retrieve and/or utilize such network tools from a network tools database 512. A network tools database 512 may include, e.g., tools that allow user 106 to interface with Network 102 and/or control operation of a network for event outcome assets system, such as tool to edit user profile preferences and filter for preferred events. Network 102 may further include an event user outcome entry database 416. In an embodiment, event user outcome entry data base 416 may comprise a database or group of databases and may store and/or index information on user outcome entries of at least an event outcome. User 106 may utilize Event viewer 404 to retrieve such information from event user outcome entry database 416 provided that they have appropriate permissions associated with their user profile, for example. Network 102 may additionally include an event outcome asset database 220. In an embodiment event outcome asset database 420 may comprise a database or group of databases and may store and/or index information on the outcome of event 112, users who are assigned the table coordinate corresponding to the outcome of event 112 (winners), and assets awarded to winners of a corresponding event. In an example, user 106 may interact with an Event viewer 404 to locate information from an event outcome asset database 420.

Still referring to FIG. 5, network 102 may include Event viewer 404 as described above with reference FIG. 2. Event viewer 404 may include an event GUI 516. In an embodiment, event GUI 516 which may comprise software user 106 may utilize to interact with the Event viewer 404, such as, for example, a display presenting any network tools, event user outcome entries, and/or event outcome assets the user is entitled to access as specified in settings stored in user profile and permissions database 508. Event viewer 404 may further include an event GUI layout information 518, which may indicate an order and/or screen location in which the Event viewer may display network tools, event user outcome entries, and event outcome assets in order to provide a consistent and customizable user experience for each individual user. Event viewer 404 may additionally include a login control 520. In an embodiment, login control 520 may comprise a software program or module that activates when user 106 attempts to access the Event viewer and requires the user to provide identifying information, such as a username and password, before the user can access the Event viewer. Continuing that example, several other security features can be implemented such as P2P, biometric, blockchain and a myriad of other secure login features that a person of ordinary skill in the art after reading this disclosure in its entirety will readily appreciate. Login control 520 may further include a login GUI 524. In an embodiment login GUI 524 may comprise a graphical user interface that user 106 may utilize during a login procedure such as providing a username and password. In some embodiments, login GUI 524 may prevent user 106 from accessing Event viewer 404 and associated components/features without first verifying their identity.

With continued reference to FIG. 5, event 204 may additionally include an event information 328. In an embodiment event information 528 may include a copy of the event information stored in event information database 408 and that user 106 may alter through event GUI 516. Event information 528 may include host preferences 532 where a host site, such as a gaming network, makes available to user their settings, in an embodiment. Event viewer 404 may further include a token box 536. In an embodiment token box 536 may include an appropriate GUI for account verification and remittance are controlled and displayed. Token box 536 may in part enable users to withdraw tokens from, for example, a personal checking account into user profile 544, where these tokens can then be used for placing user outcome entries. In some embodiments, Network 102 and/or Event viewer 404 may display an amount the user may be charged for placing a user outcome entry for an event outcome and the balance in the associated account.

Still referring to FIG. 5, Event viewer 404 may further include a current profile 340. In an embodiment current profile 540 may comprise a display module and/or data storage that governs and/or indicates a user's ability to access network tools, event user outcome entries, and/or event outcome assets. It is noted that although a current profile 540 is shown as part of Event viewer 404, in some embodiments it may be stored/located outside of the Event viewer and/or network 102, as appropriate. Current profile 540 may include a user profile 544, which may store data associated with an individual user who is currently accessing Network 102 and/or particular tools they are authorized to access, for example. Current profile 540 may further include a network tools 548, an event user outcome entries 552, and/or an event outcome assets 556, which may provide local/remote copies of any or all network tools, event user outcome entries, and/or event outcome assets user 106 who is currently accessing Network 102 is authorized to access. Although network tools 548, event user outcome entries 552, and/or event outcome assets are illustrated as being parts of current profile 340, they may be stored outside of the current profile, Event viewer 404, and/or network 102, as appropriate. In one example, the tools 528 and data from 552 and/or 556 may be temporarily or permanently stored on a user's computer. FIG. 5 and elements of FIG. 5 are provided by way of example and some elements may not be necessary for certain embodiments of the innovation described in the instant application.

Figure 6:
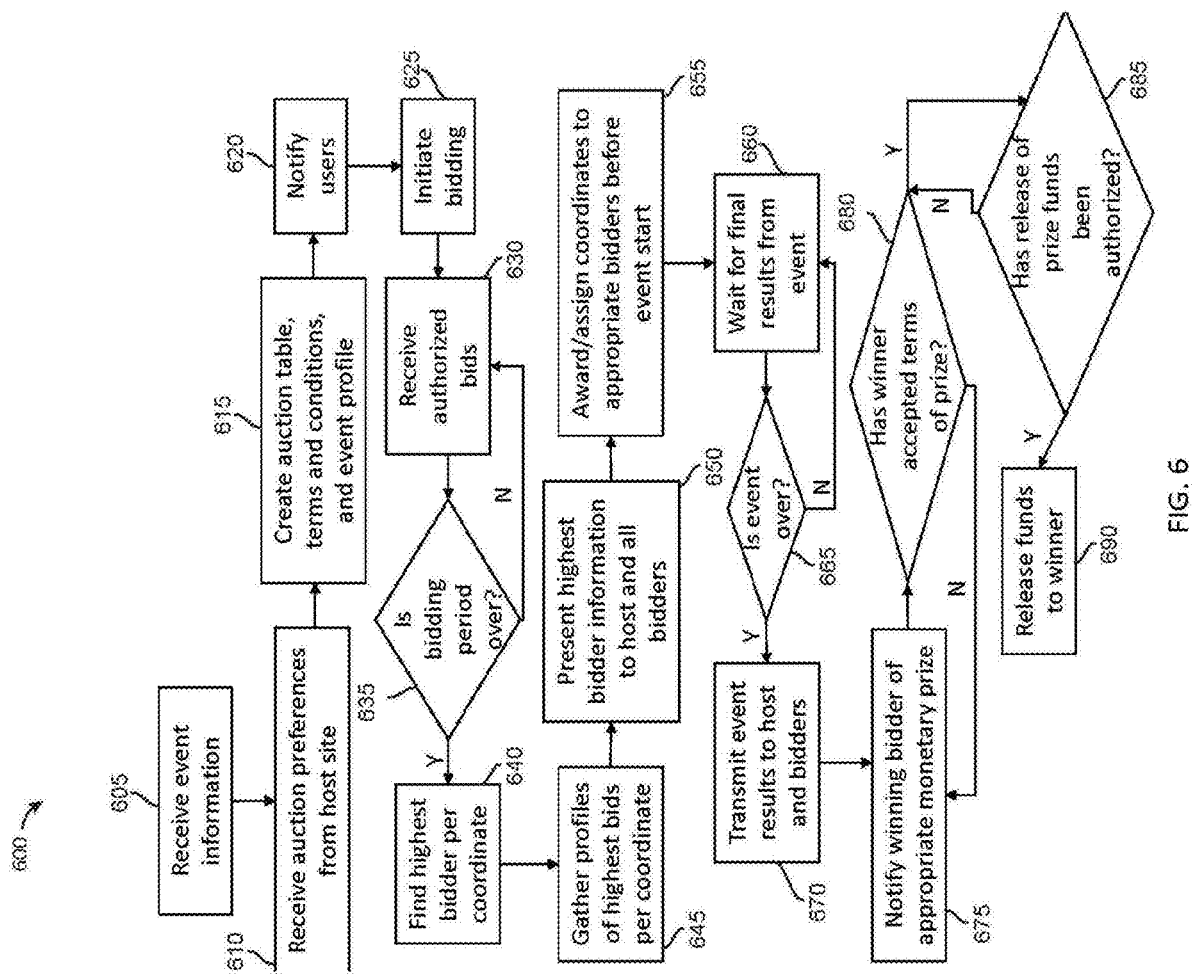
FIG. 6 is a flow diagram illustrating further details of the system for selecting a remote device based on event outcomes of FIG. 1 in accordance with an embodiment.

FIG. 6 illustrates a method for selecting a remote device based on event outcomes 600 according to exemplary aspects of the invention that can be implemented by one or more components of system 100 of FIG. 1, as appropriate.

Method 600 may be implemented according to any means or method as described above in reference to FIGS. 1-5. In this example, at step 605 information on one event is received by the system and stored in an event information database 408. At step 610, preferences from host site may be embedded. At step 615, a table is created and an optional probability engine 412 may determine and display the likelihood of each event outcome per coordinate. Also, at step 615 the terms and conditions of table 114 and event profile may be created. At step 620, users may be notified of the creation of table 114 for the outcome of the event, and at step 625 user submissions of outcome entries may be initiated. At step 630, user outcome entries may be submitted by users and received in the network 102 for the event up until a period for reception of user outcome entries is over, as determined by 635. At step 640, an optimal user outcome entry corresponding to assignable coordinate 116 for the event is determined, at step 645 optimal entries at each coordinate of assignable coordinate 116 for the event are compiled, and at step 650 the user associated with the optimal user outcome entry is made public to host site and all participants. At step 655 the user associated with the optimal user outcome entry of assignable coordinate 116 for the event may be assigned to the appropriate coordinates some time before the start of said event. In step 660, no more alterations to table 114 can occur and users must wait for the final results of the event. Users are given status updates in real-time once the event starts per the network 102. Once the event is over, as determined in step 665, final results are transmitted to host site and all users who provided user outcome entries to table 114 per step 670. At step 675, the user outcome entry assigned to the coordinate corresponding to the outcome of the event is considered the winner and notified of their prize. At step 6100, the winner must accept the terms of receiving the token 118, so step 685 can occur where the host site is given authorization to release the token 118 to winner. At step 690 the tokens are released to winning user.

Figure 7:
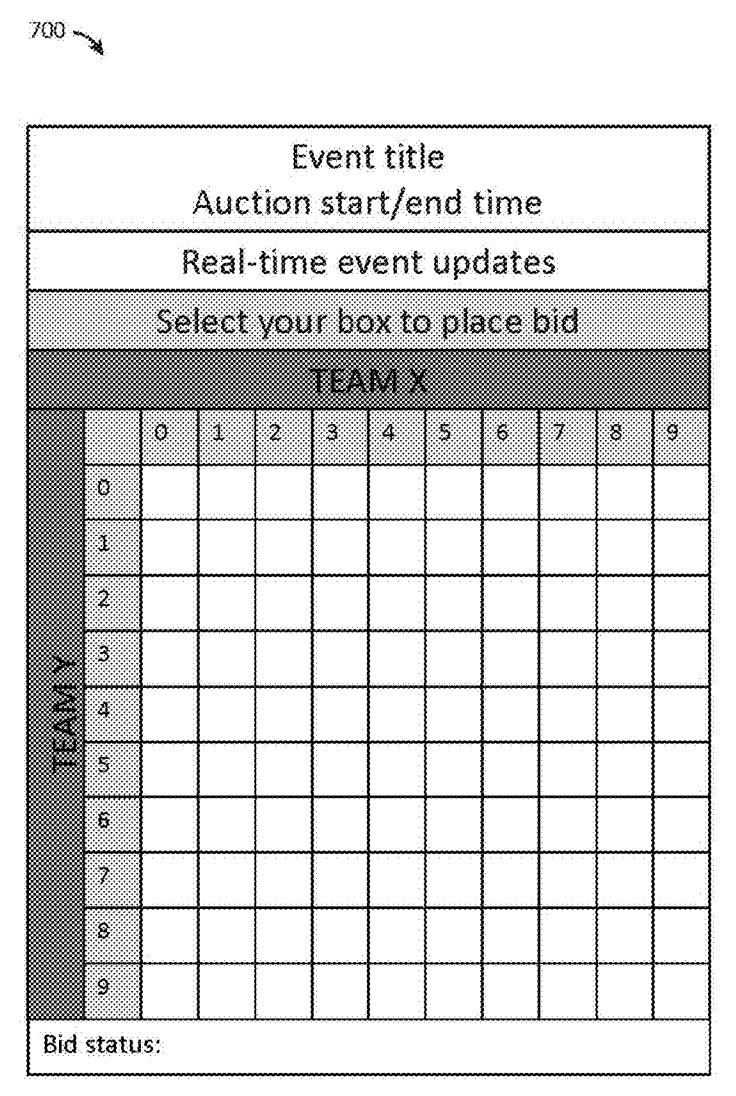

FIG. 7 represents a layout for a general table 700 that would be generated by a software from data pertaining to the event information database 408 and optional probability engine 412 and seen with Event viewer 404. Table 700 displays all data on an event to user 106, such as event title, user outcome entry start and end time, and real-time event updates. In addition, table 700 displays a grid, with the first team, Team X, on the x-axis and the second team, Team Y, on the y-axis, with instructions telling the user to choose a box to user outcome entry on. The numbers along each axis represent, for example, the last digit of the scores of two teams of a football game. The status of any user outcome entries placed on this event is also displayed at the bottom of table 700.

Figure 8:
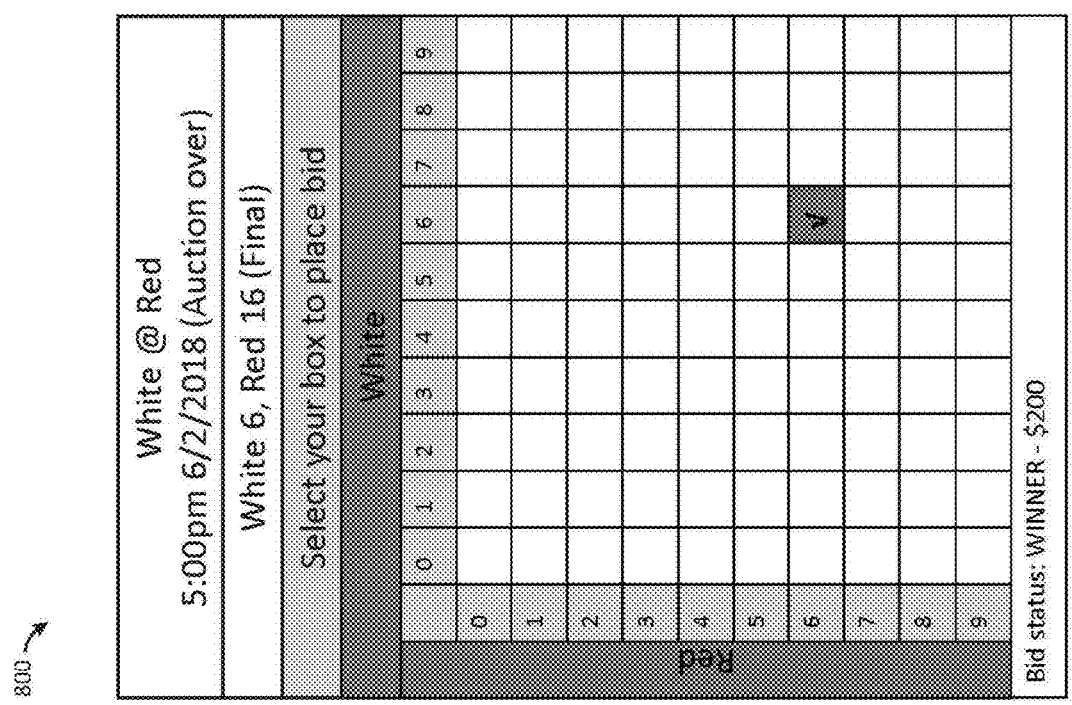
FIG. 8 is a table representing an example of a table of an event at user interface in accordance with an embodiment.

FIG. 8 represents an example of the outcome of a sporting event using the table 1000 layout. Table 800 displays a sporting event, White versus Red team, with the end time of providing user outcome entries, and final score of the game, 6 and 16 respectively. This score corresponds to column 6 on the x-axis and row 6 on the y-axis, leading to coordinate (6, 6). In this example, it can be seen that the user provided the optimal user outcome entry at that coordinate for this event, as seen with the greyed-out box and checkmark, and that they will be awarded token 118.

FIG. 9 illustrates table 900, a display at user interface that allows management of all active and past event outcomes. Along the x-axis, event data such as user outcome entry amount, event type, participating teams, coordinate user outcome entry on, status of user outcome entry in table 114, time left to user outcome entry, date of event, and outcome of event at coordinate are displayed. In addition, table 900 displays username and amount of available tokens the user has to place user outcome entries. Table 900 is not limited to this information and may even be modifiable in current profile 540 settings within Event viewer 404.

The embodiments described herein may be implemented as a computing plug-in; also referred to as a plugin, add-in, add-on, addon, or extension. A plug-in is a software component of a computer system that adds a specific feature to an existing computer program, most commonly an internet browser which communicates with a web server platform via a channel, such as the Internet. A web server platform is sometimes referred to as a "Web" site and supports files in the form of hypertext documents and objects. In the Internet paradigm, a network path to a server is identified by a Uniform Resource Locator (URL). The World Wide Web is the Internet's multimedia information retrieval system. A web server includes a set of server application functions (SAFs) where a client's request and other configuration data of the server is taken as input and returns a response to the server as output. A web server can also include an Application Programming Interface (API) that provides extensions to enable application developers to extend and/or customize the core functionality thereof, most commonly the SAFs, through plug-in software programs. A mode of allocating event outcome assets could make use of server APIs to provide a plug-in account manager that facilitates the administration and management of the features included in the embodiment of the proposed invention; making aspects readily available to third parties.

The embodiments described herein may also be executed as a downloadable mobile device application implemented in an Internet based environment with an intuitive user interface. Some aspects of the mobile device application of the invention are to provide users an interface for allocation event outcome assets without the need for users to download or install any additional software, and to have it be accessible across a wide range of different mobile devices and operating systems. In certain embodiments, a mobile application is downloaded onto a device via mobile software distribution platforms, where the service may be hosted and operated by one or more third-party service providers and may be accessed by users through network protocols on a mobile device. Network protocols may be any suitable type of wired and/or wireless network such as an Internet network or dedicated network that allows users to access mobile software distribution platforms where mobile applications can be downloaded.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 10:
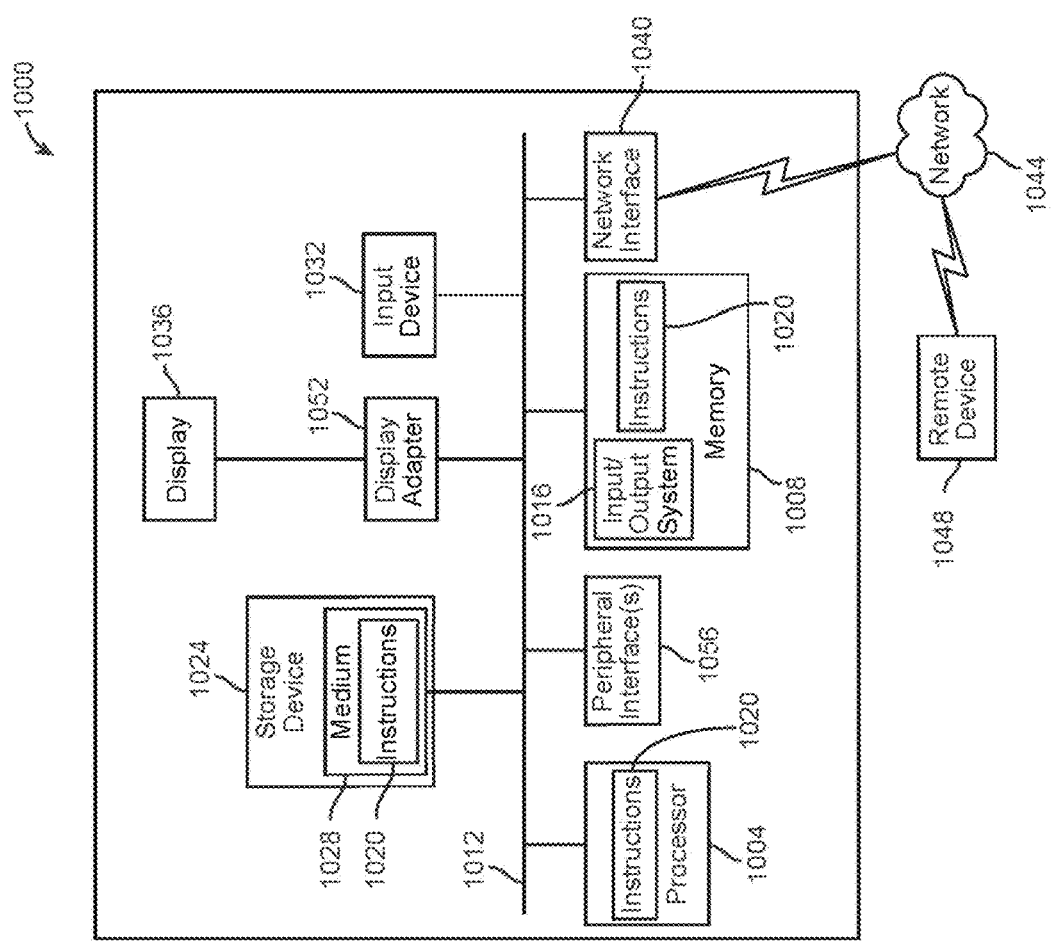
FIG. 10 is a block diagram of a computing system that can be used to implement any one or more of the methodologies disclosed herein and any one or more portions thereof.

FIG. 10 shows a diagrammatic representation of one embodiment of a computing device in the exemplary form of a computer system 1000 within which a set of instructions for causing a control system, such as the network for allocating event outcome assets system 400 of FIG. 2, to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1000 includes a processor 1004 and a memory 1008 that communicate with each other, and with other components, via a bus 1012. Bus 1012 may include any of several types of bus structures including, but not limited to, a memory bus, a memory controller, a peripheral bus, a local bus, and any combinations thereof, using any of a variety of bus architectures.

Memory 1008 may include various components (e.g., machine-readable media) including, but not limited to, a random-access memory component, a read only component, and any combinations thereof. In one example, a basic input/output system 1016 (BIOS), including basic routines that help to transfer information between elements within computer system 1000, such as during start-up, may be stored in memory 1008. Memory 1008 may also include (e.g., stored on one or more machine-readable media) instructions (e.g., software) 1020 embodying any one or more of the aspects and/or methodologies of the present disclosure. In another example, memory 1008 may further include any number of program modules including, but not limited to, an operating system, one or more application programs, other program modules, program data, and any combinations thereof.

Computer system 1000 may also include a storage device 1024. Examples of a storage device (e.g., storage device 1024) include, but are not limited to, a hard disk drive, a magnetic disk drive, an optical disc drive in combination with an optical medium, a solid-state memory device, and any combinations thereof. Storage device 1024 may be connected to bus 1012 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1024 (or one or more components thereof) may be removably interfaced with computer system 1000 (e.g., via an external port connector (not shown)). Particularly, storage device 1024 and an associated machine-readable medium 1028 may provide nonvolatile and/or volatile storage of machine-readable instructions, data structures, program modules, and/or other data for computer system 1000. In one example, software 1020 may reside, completely or partially, within machine-readable medium 1028. In another example, software 1020 may reside, completely or partially, within processor 1004.

Computer system 1000 may also include an input device 1032. In one example, a user of computer system 1000 may enter commands and/or other information into computer system 1000 via input device 1032. Examples of an input device 1032 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1032 may be interfaced to bus 1012 via any of a variety of interfaces (not shown) including, but not limited to, a serial interface, a parallel interface, a game port, a USB interface, a FIREWIRE interface, a direct interface to bus 1012, and any combinations thereof. Input device 1032 may include a touch screen interface that may be a part of or separate from display 1036, discussed further below. Input device 1032 may be utilized as a user selection device for selecting one or more graphical representations in a graphical interface as described above.

A user may also input commands and/or other information to computer system 1000 via storage device 1024 (e.g., a removable disk drive, a flash drive, etc.) and/or network interface device 1040. A network interface device, such as network interface device 1040, may be utilized for connecting computer system 1000 to one or more of a variety of networks, such as network 1044, and one or more remote devices 1048 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1044, may employ a wired and/or a wireless mode of communication. In general, any network topology may be used. Information (e.g., data, software 1020, etc.) may be communicated to and/or from computer system 1000 via network interface device 1040.

Computer system 1000 may further include a video display adapter 1052 for communicating a displayable image to a display device, such as display device 1036. Examples of a display device include, but are not limited to, a liquid crystal display (LCD), a cathode ray tube (CRT), a plasma display, a light emitting diode (LED) display, and any combinations thereof. Display adapter 1052 and display device 1036 may be utilized in combination with processor 1004 to provide graphical representations of aspects of the present disclosure. In addition to a display device, computer system 1000 may include one or more other peripheral output devices including, but not limited to, an audio speaker, a printer, and any combinations thereof. Such peripheral output devices may be connected to bus 1012 via a peripheral interface 1056. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of selecting a remote device based on event outcomes comprising:
   receiving, by a processor from a database, a plurality of data associated with outcomes of an event;
   generating, by the processor, a table comprising a plurality of assignable coordinates, wherein each coordinate of the plurality of coordinates are associated with an occurrence of an outcome of the event;
   receiving, by the processor and via at least a server, a plurality of user outcome entries associated with a plurality of users, wherein a user outcome of the plurality of user outcome entries is received as an interaction with a user device;
   allocating, by the processor, the plurality of user outcome entries to the plurality of assignable coordinates;
   determining, by the processor and based on the plurality of assignable coordinates, a plurality of optimal user outcome entries associated with the occurrence of the outcome of the event;
   selecting, by the processor in response to the determination, based on at least an allocated assignable coordinate of the plurality of assignable coordinates comprising at least an optimal user outcome entry of the plurality of optimal user outcome entries, at least a first user of the plurality of users associated with the at least an optimal user outcome entry; and
   transmitting, by the processor in response to the selection, at least a token to the remote device, wherein the remote device is associated with the at least a first user.

2. The method of claim 1, wherein generating the table comprises generating at least a grid comprising a plurality of identifiable rows and a plurality of identifiable columns; wherein each assignable coordinate of the plurality of assignable coordinates represents an intersection of at least an identifiable row of the plurality of identifiable rows and at least an identifiable column of the plurality of identifiable columns.

3. The method of claim 2, wherein assigning the plurality of user outcome entries to the plurality of assignable coordinates further comprises assigning each user outcome entry of the plurality of user outcome entries to at least an intersection of at least an identifiable row and at least an identifiable column.

4. The method of claim 1, wherein each user outcome entry of the plurality of user outcome entries is configured to include at least a numerical quantity associated with at least a first user of the plurality of users.

5. The method of claim 4, wherein each outcome of an event is configured to be associated with each assignable coordinate of the plurality of assignable coordinates and each assignable coordinate associated with an outcome of the plurality of outcomes is configured to include a first user outcome entry.

6. The method according to claim 5, wherein receiving the plurality of user outcome entries further comprises:
   receiving a second user outcome entry from at least a second user of the plurality of users comprising at least a second numerical quantity;
   comparing the first user outcome entry and the second user outcome entry;
   assigning the second user outcome entry to the at least an assignable coordinate associated with the first user outcome entry if the second numerical quantity exceeds the first numerical quantity;
   presenting, by the at least a server, the second user outcome entry to a user interface.

7. The method of claim 6, wherein assigning the plurality of user outcome entries to the plurality of assignable coordinates further comprises:
   disassociating the first user outcome entry from the outcome of the event; and
   incrementing the at least a second numerical quantity by the at least a first numerical quantity.

8. The method of claim 1, wherein assigning the plurality of user outcome entries to the plurality of assignable coordinates further comprises:
   determining an available user balance associated with each user of the plurality of users; and
   determining that the available user balance exceeds a current numerical quantity associated with the at least an assignable coordinate based on a subset of the plurality of user outcome entries.

9. The method of claim 1, wherein assigning the plurality of user outcome entries to the plurality of assignable coordinates further comprises:
   determining an available user balance associated with each user of the plurality of users;

selecting, by the at least a first user, the at least an assignable coordinate configured to include a subset of the plurality of user outcome entries; and decrementing the available user balance by a current numerical quantity associated with the at least an assignable coordinate based on a subset of the plurality of user outcome entries.

10. A system for selecting a remote device based on event outcomes comprising:
at least a server, the at least a server designed and configured to:
receive, by a processor from a database, a plurality of data associated with an outcome of an event;
generate, by the processor, a table comprising a plurality of assignable coordinates,
wherein each coordinate of the plurality of coordinates are associated with an occurrence of an outcome of the event;
receive, by the processor, a plurality of user outcome entries associated with a plurality of users, wherein a user outcome of the plurality of user outcome entries is received as an interaction with a user device;
allocate, by the processor, the plurality of user outcome entries to the plurality of assignable coordinates;
determine, by the processor and based on the plurality of assignable coordinates, a plurality of optimal user outcome entries associated with the occurrence of the outcome of the event;
select, based on the processor in response to the determination, based on at least an allocated assignable coordinate of the plurality of assignable coordinates comprising at least an optimal user outcome entry of the plurality of optimal user outcome entries, at least a first user of the plurality of users associated with the at least an optimal user outcome entry; and
transmit, by the processor in response to the selection, at least a token to the remote device, wherein the remote device is associated with the at least a first user.

11. The system of claim 10, wherein generating the table comprises generating at least a grid comprising a plurality of identifiable rows and a plurality of identifiable columns; wherein each assignable coordinate of the plurality of assignable coordinates represents an intersection of at least an identifiable row of the plurality of identifiable rows and at least an identifiable column of the plurality of identifiable columns.

12. The system of claim 11, wherein assigning the plurality of user outcome entries to the plurality of assignable coordinates further comprises assigning each user outcome entry of the plurality of user outcome entries to at least an intersection of at least an identifiable row and at least an identifiable column.

13. The system of claim 10, wherein each user outcome entry of the plurality of user outcome entries is configured to include at least a first numerical quantity associated with at least a first user of the plurality of users.

14. The system of claim 10, wherein each outcome of an event is configured to be associated with each assignable coordinate of the plurality of assignable coordinates and each assignable coordinate associated with an outcome of the plurality of outcomes is configured to include a first user outcome entry.

15. The system of claim 10, wherein receiving the plurality of user outcome entries further comprises:
receiving a second user outcome entry from at least a second user of the plurality of users comprising at least a second numerical quantity;
comparing the first user outcome entry and the second user outcome entry;
assigning the second user outcome entry to the at least an assignable coordinate associated with the first user outcome entry if the second numerical quantity exceeds the first numerical quantity;
presenting, by the at least a server, the second user outcome entry to a user interface.

16. The system of claim 10, wherein assigning the plurality of user outcome entries to the plurality of assignable coordinates further comprises:
disassociating the first user outcome entry from the outcome of the event; and
incrementing the at least a second numerical quantity by the at least a numerical quantity.

17. The system of claim 10, wherein assigning the plurality of user outcome entries to the plurality of assignable coordinates further comprises:
determining an available user balance associated with each user of the plurality of users; and
determining that the available user balance exceeds a current numerical quantity associated with the at least an assignable coordinate based on a subset of the plurality of user outcome entries.

18. The system of claim 10, wherein assigning the plurality of user outcome entries to the plurality of assignable coordinates further comprises:
determining an available user balance associated with each user of the plurality of users;
selecting, by the at least a first user, the at least an assignable coordinate configured to include a subset of the plurality of user outcome entries; and
decrementing the available user balance by a current numerical quantity associated with the at least an assignable coordinate based on a subset of the plurality of user outcome entries.

19. The system of claim 10, wherein the at least a server is configured to associate each outcome of an event with each assignable coordinate of the plurality of assignable coordinates and each assignable coordinate is configured to include a first user outcome entry.

20. A method for selecting a remote client device in a gaming network comprising:
receiving, by a processor via the gaming network, a plurality of event data;
generating, by the processor, a table comprising a plurality of assignable coordinates, wherein each coordinate of the plurality of coordinates is associated with an occurrence of an outcome of the event;
receiving, by the processor via the gaming network, a plurality of user outcome entries associated with a plurality of users, wherein a user outcome of the plurality of user outcome entries is received as an interaction with a user device;
allocating, by the processor, the plurality of user outcome entries to the plurality of assignable coordinates;
determining, by the processor based on the plurality of assignable coordinates, a plurality of optimal user outcome entries associated with the occurrence of the outcome of the event;
selecting, by the processor in response to the determination, based on at least an allocated assignable coordinate of the plurality of assignable coordinates comprising at least an optimal user outcome entry of the plurality of optimal user outcome entries, at least a first user of the plurality of users associated with the at least an optimal user outcome entry; and transmitting, by the processor in response to the selection, at least a token to the remote device, wherein the remote device is associated with the at least a first user.

\* \* \* \* \*